United States Patent
Hodges

(10) Patent No.: US 12,338,791 B1
(45) Date of Patent: Jun. 24, 2025

(54) WIND TURBINES

(71) Applicant: Halcium Energy Inc, Farmington, UT (US)

(72) Inventor: Nicholas Hodges, West Bountiful, UT (US)

( * ) Notice: Subject to any disclaimer, the term of this patent is extended or adjusted under 35 U.S.C. 154(b) by 7 days.

(21) Appl. No.: 18/346,442

(22) Filed: Jul. 3, 2023

(51) Int. Cl.
*F03D 3/04* (2006.01)
*F03D 3/00* (2006.01)

(52) U.S. Cl.
CPC ........... *F03D 3/0427* (2013.01); *F03D 3/005* (2013.01); *F05B 2220/706* (2013.01); *F05B 2240/131* (2013.01)

(58) Field of Classification Search
CPC .................................................. F05B 2240/131
See application file for complete search history.

(56) References Cited

U.S. PATENT DOCUMENTS

| | | | | |
|---|---|---|---|---|
| 10,280,900 | B1* | 5/2019 | Krippene | F03D 3/0427 |
| 11,994,103 | B2* | 5/2024 | Leoshko | F03D 3/009 |
| 2012/0187698 | A1* | 7/2012 | Bassett | F03D 3/062 |
| | | | | 290/55 |
| 2014/0105738 | A1* | 4/2014 | Bassett | F03D 9/25 |
| | | | | 239/589 |
| 2016/0084227 | A1* | 3/2016 | Krippene | F03D 3/0454 |
| | | | | 290/55 |
| 2019/0195195 | A1* | 6/2019 | Theis | F02C 1/00 |
| 2024/0191688 | A1* | 6/2024 | Smith | F03D 3/0427 |

OTHER PUBLICATIONS

Powerpod. Product description on Halcium.com. Halcium Energy, 2020 [retrieved on Sep. 6, 2024]. Retrieved from Internet Archive's The Wayback Machine: <URL: https://web.archive.org/web/20201005114508/https://www.halcium.com/> (Year: 2020).*
Reddit thread titled "Prototype Wind Turbine . . . " 10 pages, posted Sep. 29, 2020 by user "nicholas5395". Retrieved from Internet: <URL: https://www.reddit.com/r/3Dprinting/comments/j20wqt/prototype_wind_turbine_600_parts_on_a_hatchbox/> (Year: 2020).*
Alternate capture of Reddit thread titled "Prototype Wind Turbine . . . " 6 pages, posted Sep. 29, 2020 by user "nicholas5395". Retrieved from Internet: <URL: https://www.reddit.com/r/3Dprinting/comments/j20wqt/prototype_wind_turbine_600_parts_on_a_hatchbox/> (Year: 2020).*
Powerful Safe Wind Energy. Kickstarter project, started by Halcium on Sep. 29, 2020. Last updated Dec. 2, 2020. Retrieved from Internet: <URL: https://www.kickstarter.com/projects/nickhodges/powerful-safe-wind-energy/description> (Year: 2020).*

* cited by examiner

*Primary Examiner* — Tulsidas C Patel
*Assistant Examiner* — Thomas K Quigley
(74) *Attorney, Agent, or Firm* — Miller IP Law; Devin Miller

(57) ABSTRACT

Described herein are examples of devices which include a vertical axis wind turbine configured to receive wind from 360°. The vertical axis wind turbine includes a top portion with a circular geometry, a body portion with a conical geometry and an aperture formed in the center of the body portion to allow wind egress. Vanes, a top portion, and a body portion define channels configured to increase velocity of incoming wind via tapering of the volume of the channel as the channel approaches a central axis of the vertical wind turbine. A generator can be coupled to the central axis and be configured to produce electrical energy from the spinning of the central axis.

20 Claims, 8 Drawing Sheets

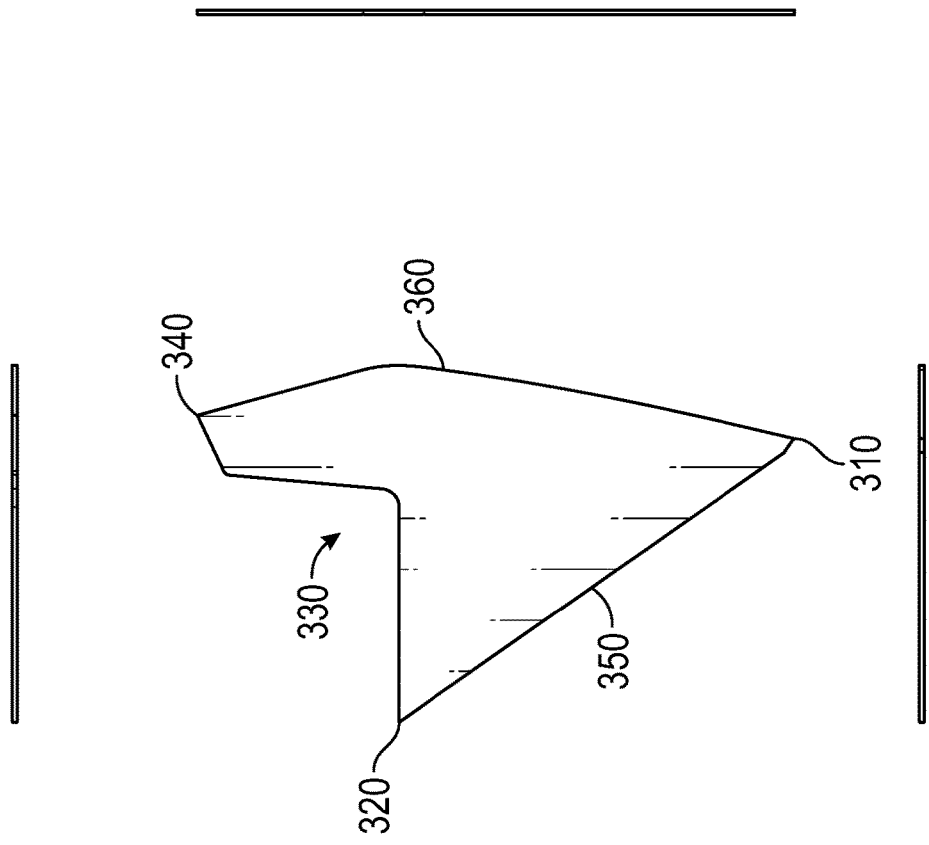
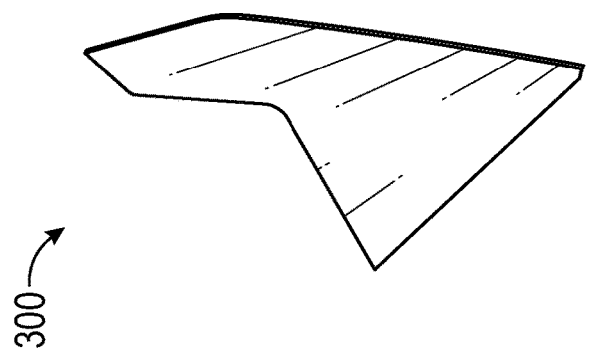
FIG. 3

WIND TURBINES

BACKGROUND

Renewable carbon-friendly energy sources provide many benefits for future energy consumption. Examples include hydroelectric, solar, geothermal and wind. Wind energy in particular has been one of the oldest forms of renewable energy harvested by humans from sail powered boats to wind driven mills. Providing a highly efficient and inexpensive renewable energy source can alleviate many problems associated with our modern carbon dependent economy and provide vast amounts of energy for future endeavors.

BRIEF DESCRIPTION OF THE DRAWINGS

The present description will be understood more fully when viewed in conjunction with the accompanying drawings of various examples of wind turbines. The description is not meant to limit the wind turbines to the specific examples. Rather, the specific examples depicted and described are provided for explanation and understanding of wind turbines. Throughout the description the drawings may be referred to as drawings, figures, and/or FIGS.

FIG. 3 illustrates a vane of a vertical axis wind turbine, according to an embodiment.

DETAILED DESCRIPTION

Figure 1:
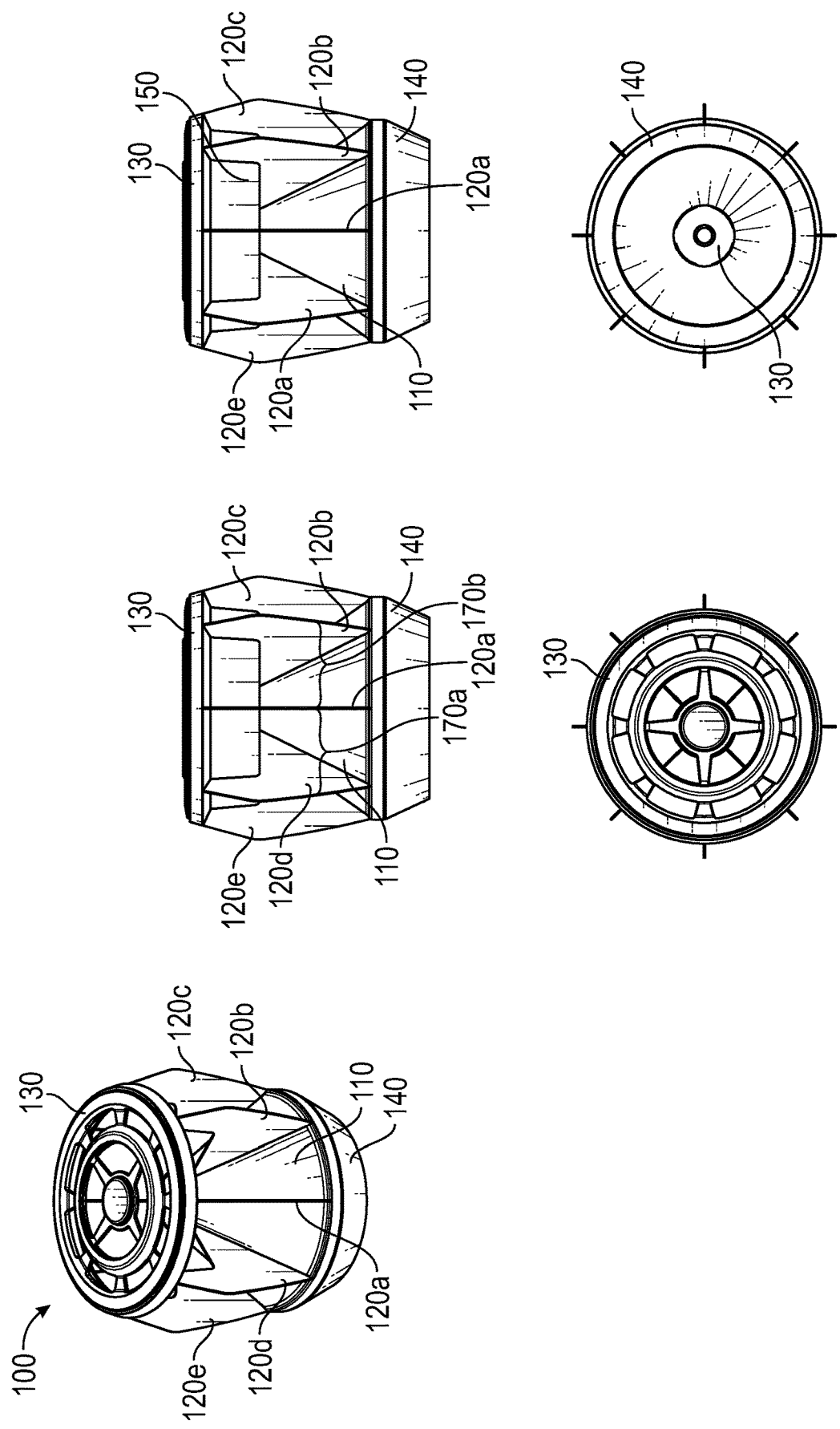
FIG. 1 illustrates a vertical axis wind turbine, according to an embodiment.

Wind turbines as disclosed herein will become better understood through a review of the following detailed description in conjunction with the figures. The detailed description and figures provide merely examples of the various embodiments of wind turbines. Many variations are contemplated for different applications and design considerations; however, for the sake of brevity and clarity, all the contemplated variations may not be individually described in the following detailed description. Those skilled in the art will understand how the disclosed examples may be varied, modified, and altered and not depart in substance from the scope of the examples described herein.

Conventional wind turbines are horizontal axis turbines, which describes the rotational orientation of the turbine. More importantly, these horizontal axis turbines are dependent on a specific direction of wind to generate energy. A conventional horizontal axis wind turbine (HAWT) will generally have blades (or vanes) that extend radially from a center point of the turbine (axis) and stretch down towards the ground and upwards towards the sky (perpendicular to flat land upon which the turbine rests). This conventional horizontal axis turbine will be most effective in a wind that is head-on towards the center point of the turbine axis, i.e., if the axis faces due East, wind coming from due West will provide the greatest and most efficient energy. Horizontal axis turbines make up the majority of wind turbines in use today.

HAWT also generally have more expensive and more complicated blades due to local air flow speed issues. This requires tapered and twisted blades that are expensive to design and manufacture. Blade tip speed for vertical-axis wind turbines (VAWT) can be lower, resulting in less noise, a common complaint about wind turbines.

While it is possible to change the orientation (or yaw) of a horizontal axis turbine, such as by moving the turbine to re-orient the axis from due East to East by North-East, or North, moving large scale wind turbines is difficult, energy intensive, and potentially damaging to the wind turbine.

Alternatively, vertical axis turbines can produce energy from wind traveling in any direction. Vertical axis turbines have the added benefit of allowing the generator and gearboxes to be located closer to the ground (in contrast to the axis of most horizontal wind turbines, which can be located hundreds of feet in the air). This provides easier and less costly maintenance.

Vertical axis turbines have described and used in limited circumstances. Examples of vertical-axis wind turbines (VAWT) include the Savonius (drag type, simpler, less efficient) and the Darrieus (lift type, more complex, more efficient) wind turbine. Unfortunately, these variations are known to have significant torque ripple from their helically sweeping blades. Regardless, vertical axis turbines generate less turbulence than horizontal axis turbines and some estimates suggest they are at least 15% more efficient.

Implementations of vertical axis wind turbines without helical blades may address some or all of the problems described above. A vertical axis wind turbine can receive wind from various directions without the need to re-orient the turbine. The wind turbine includes a generally circular footprint with a variable radius and height. The wind turbine can have multiple wind intakes along the perimeter of the wind turbine. Vanes can define the wind intakes, with embodiments in which the vanes extend vertically from an upper portion of the wind turbine to a lower portion of the wind turbine creating an wind intake channel. Embodiments of the wind intake channel can include a cross section that decreases as it approaches a central axis of the turbine, thereby increasing the velocity of the wind and resultant kinetic energy. This is caused by the Venturi Effect. The increased velocity wind is then directed towards a movable blade attached to a generator to produce energy.

Studies have shown the Venturi Effect to result in a 15-50% increase in power generation. Additionally, the lower required initial wind speed allows for energy production on a greater percentage of days, because of a lower threshold activation level for the turbine, i.e., low wind speeds that may not turn a conventional horizontal wind turbine can be harnessed for energy production via vertical wind turbines.

FIG. 1 illustrates a vertical axis wind turbine, according to an embodiment. The vertical axis wind turbine 100 includes a body portion 110, vanes 120a, 120b, 120c, 120d, 120e, a top portion 130, a base portion 140, a blade 150, a central axis 160, and channels 170a, 170b. The vanes 120a, 120b, 120c, 120d, 120e extend radially outward from the body portion 110 and vertically from the top portion 130 to the base portion 140. The vanes 120a, 120b, 120c, 120d, 120e define channels 170a, 170b which direct wind inwards towards the center of the vertical axis wind turbine 100.

Embodiments of the vertical axis wind turbine 100 include a body portion 110 that has a conical geometry with the exterior of the body portion 110 slopping inward and upward from the base portion 110 towards the central axis 160 of the vertical axis wind turbine 100 as the body portion 110 approaches the top portion 130.

The vertical axis wind turbine 100 contains multiple vanes 120a, 120b, 120c, 120d, 120e. The vertical axis wind turbine 100 can contain between 2 and 50 vanes, between 4 and 20 vanes, between 6 and 10 vanes, and variations thereof. Embodiments can include eight vanes 120 and eight channels 170. The vanes 120a, 120b, 120c, 120d, 120e in conjunction with the body portion 110 and top portion 130 define the channels 170a, 170b in which the wind is funneled to a central axis.

The base portion 140 can have a circular geometry with a tapered slope that tappers inward as the base portion 140 extends downward from the body portion 110. The tapering allows for wind egress from the vertical axis wind turbine 100.

Embodiments of the vanes 120 are generally narrow in width and have a vertical length defined by the distance between the top portion 130 and the base portion 140. The vanes 120 create channels 170a, 170b that direct wind towards the central axis of the vertical axis wind turbine 100. The conical geometry of the body portion 110 creates a channel 170 that narrows as it approaches the central axis. This narrowing increases the velocity of the wind resulting in greater kinetic wind energy to be translated into energy via the generator.

Embodiments of the top portion 130 have a circular geometry with a narrow width. The top portion 130 assists with either re-directing the wind after it passes through the channels and/or allowing for wind egress from the vertical axis wind turbine 100. Embodiments include a top portion with a latticed configuration created by spokes and rings that will allow air flow around the vertical axis wind turbine 100.

The blade 150 rotates around a central axis 160. The wind causes the blade 150 to turn the central axis 160 thereby powering the generator (not shown). Embodiments of the blade 150 can include individual blades extending radially from the central axis 160 or a ring of blades 150 connected by a ring frame connected to the central axis 160.

The channels 170 are incorporated around the perimeter of the wind turbine 100, the wind turbine 100 can receive wind from 360° without the need for a yaw system, or movement or adjustment of the wind turbine 100. As the wind enters a channel 170 the wind is directed radially inward towards a central axis of the wind turbine 100. In embodiments wind enters the channel 170 on an approximately horizontal trajectory. As the wind moves radially inward, the wind turbine 100 redirects the wind downward, or substantially orthogonal to the intake direction, through an aperture in the body portion 110. The wind may also egress through the top portion 130 of the wind turbine 100 in embodiments that have a non-solid top portion 130.

Embodiments of the wind turbine 100 subject wind to a decreasing cross section as the wind travels through the channels 170. The decreasing cross section causes an increase in velocity of the wind due to the Venturi Effect. In embodiments, the vanes 120 can form horizontally decreasing channels 170 with the top portion 130 and the body portion 110 substantially parallel to each other. Alternative embodiments can include a top portion 130 and the body portion 130 that converge relative to one another to form a vertically decreasing channel 170.

Embodiments can include a top portion 130 with a constant thickness, a variable thickness, concavity, convexity, or planar. Embodiments can include a solid convex dome. Embodiments of the top portion 130 can include corners, flanges, points, scallops, fins, or other geometries or structures incorporated on the edge or the body of the top portion 130. Embodiments of the top portion 130 can have openings (or a lattice structure) that coincide with the location of the vanes 120, the channels 170, as well as the openings or lattice structure of the top portion 130.

Embodiments of the wind turbine 100 can include a top portion 130 and/or a base portion 140 that are squared, rounded, bladed, or alternative geometries. The wind turbine can include structures such as a lip, a spoiler, a roughening, a polish, or combinations thereof. The surfaces and structures of the wind turbine 100 can include other surface treatments or structures.

Embodiments of the wind turbine 100 can be coupled to a generator capable of converting mechanical motion into electric power. The wind turbine 100 may alternatively be coupled to an energy storage system. Other embodiments include other systems of utilizing the rotational motion of the wind turbine 100.

Embodiments include a vertical axis wind turbine configured to receive wind from 360°, the vertical axis wind turbine including a top portion with a circular geometry; a body portion with a conical geometry including an upper body portion, a lower body portion, and an aperture formed in the center of the upper body portion. Embodiments include the body portion tapering inward to the center of the vertical axis wind turbine from the lower body portion to the upper body portion. The base portion can be coupled below the body portion. The base portion can have a circular geometry surrounding a base portion aperture. The base portion further comprises an upper base portion and a lower base portion. Embodiments include vanes extending radially outward from the body portion and vertically from the top portion to the base portion. The vanes, top portion and body portion define channels configured to increase velocity of incoming wind via tapering of the volume of the channel as the channel approaches a central axis of the vertical wind turbine. The central axis is located at the center of the aperture formed in the center of the upper body portion. The central axis is coupled to a blade configured to receive wind from the channels and turn the central axis. A generator can be coupled to the central axis and be configured to produce electrical energy from the spinning of the central axis.

Embodiments include a vertical axis wind turbine configured to receive wind from 360° wherein the vertical axis wind turbine includes vanes extending between a top portion and a base portion and the vanes further extending radially from a conical body portion positioned between the top portion and the base portion. Embodiments of the vanes, top portion and body portion define channels configured to increase velocity of incoming wind via tapering of the volume of the channel as the channel approaches a central axis of the vertical wind turbine. The vertical axis wind turbine further includes a blade, blades or ring structures comprising multiple blades coupled to the central axis. The blade is configured to receive wind and turn the central axis. The central axis can be coupled to a generator configured to produce electrical energy.

Figure 2:
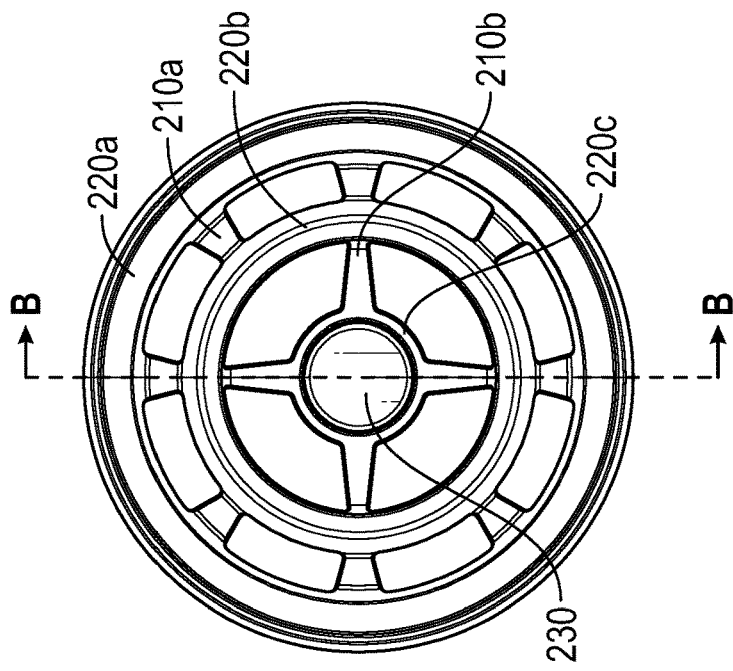
FIG. 2 illustrates a top portion of a vertical axis wind turbine, according to an embodiment.

FIG. 2 illustrates a top portion 200 of a vertical axis wind turbine, according to an embodiment. The top portion 200 as illustrated in FIG. 2 contains multiple spokes 210 and rings 220 that create a latticed structure to the top portion 200. Embodiments can include three rings 220a, 220b, 220c joined by spokes 210a and 210b with a top portion center 230. Embodiments can include between 2 and 20 spokes 210 connecting each ring 220 and can include between 2 and 10 rings 220 leading toward the center 230. Embodiments can include a solid top portion 200 without any rings 220 or spokes 210. Alternate lattice structures can be employed for the top portion, such as rectangular, triangular, or square hatches. The lattice structure illustrated in FIG. 2 is configured to allow for air flow out of the vertical axis wind turbine. Embodiments include spokes in the top portion aligned with the location of the vanes, and the alignment is configured to assist wind egress from the vertical axis wind turbine.

Embodiments of the top portion 200 can be between 10 and 250 inches in diameter, between 25 and 100 inches in diameter, and between 40 and 60 inches in diameter. Embodiments include a top portion 200 that is 45 inches in diameter. Embodiments of the height of the top portion 200 can be between 1 and 10 inches in height, between 2 and 8 inches in height, and between 3 and 6 inches in height. Embodiments of the top portion 200 can have a height of 5 inches. The length and width of the rings and spokes can be varied, but the spokes will generally be between 1 and 5 inches in length and width, and the rings will have diameters smaller than the outmost edge of the top portion 200.

FIG. 3 illustrates a vane 300, according to an embodiment. The vane 300 illustrated in FIG. 3 has a triangular geometry with a lower point 310, an upper point 340, an interior point 320, and a vane cut-out portion 330. The vane cut-out portion 330 forms an approximately 90° angle on the interior upper portion of the vane 300. Alternative vane cut-out portion interior angles include 95°, 100°, 105°, 110°, 115°, and 120°. The vane cut-out portion 330 allows the blade 150 (see FIGS. 1 and 7) to rotate within the vertical axis wind turbine. The vane exterior edge 360 faces outwards towards the incoming wind. The vane interior edge 350 is coupled to the body portion 110 (see FIG. 1). Alternative shapes, configurations, sizes, and angles of the vane 300 are envisioned by the present invention. The combination of the vanes 300, which form the channels, direct the wind inwards towards the blades that turn the central axis of the vertical axis wind turbine. The central axis is coupled to a generator which produces energy from the rotation of the central axis.

Embodiments of the vane 300 can be between 5 and 100 inches in vertical height, between 15 and 75 inches in vertical height, and between 25 and 50 inches in vertical height. Embodiments can include a vane 300 that is 30 inches in vertical height. The horizontal length of the vane 300 can be between 5 and 50 inches in length, between 10 and 30 inches in length, and between 15 and 25 inches in length. Embodiments can include a vane 300 that is 19 inches in horizontal length.

Embodiments of the cut-out portion 330 can have a horizontal length between 3 and 30 inches, between 5 and 20 inches, and between 8 and 15 inches. Embodiment can include a horizontal length of 12 inches. Embodiments of the cut-out portion 330 can have a vertical height between 3 and 30 inches, between 5 and 20 inches, and between 8 and 15 inches. Embodiments can include a vertical height of 10 inches. The cut-out portion 330 is configured to allow a blade to spin in the interior of the wind turbine.

The vane exterior edge 360 can be generally straight, or it can be angled outward. Embodiments include a vane exterior edge 360 that includes an angle opposite the interior angle of the cut-out portion 330. The shape of the vane exterior edge 360 can be varied to accommodate the top portion and the body portion. Additionally, the cut-out portion 330 can be varied to accommodate the blade.

Embodiments of the vane exterior edge 360 can be shorter than, equal to, or longer than a diameter of the wind turbine 100. As illustrated in FIG. 1 the vanes 120 extend radially outward from the body portion 110 along a straight or linear path. The vanes 120, 300 may also follow a curvilinear geometry or a non-linear geometry outward from the wind turbine 100.

Figure 4:
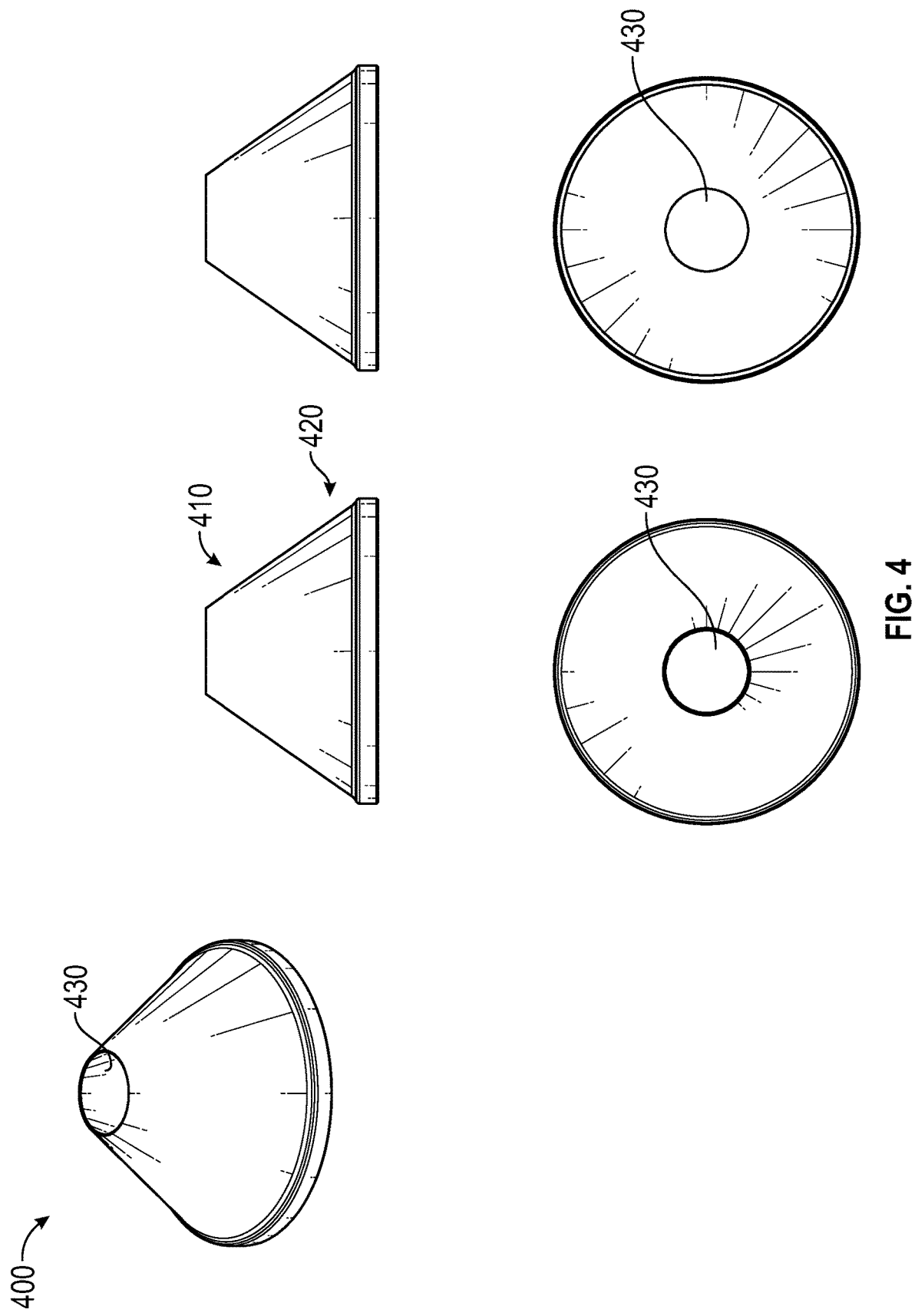
FIG. 4 illustrates a body portion of a vertical axis wind turbine according to an embodiment.

FIG. 4 illustrates the body portion 400, according to an embodiment. The body portion 400 has a conical geometry. Embodiments of the body portion 400 can be conical as illustrated in FIG. 4. Alternate shapes of the body portion 400 can be employed that provide a narrowing channel for wind to be funneled to the central axis of the wind turbine with assistance from the vanes as sidewalls. The angle of the tapering of the body portion 400 can be between 30° and 60°, between 40° and 50°, and between 42.5° and 47.5°. Embodiments can have a tapering of 45°. The tapering results in a narrow upper portion 410 of the body portion 400 and a wider lower portion 420 of the body portion 400. The peak of the upper portion 410 contains a circular aperture 430 (or central aperture) that allows for egress of wind through the central core of the body portion 400. Wind can also egress upwards toward and/or through the top portion (not shown). Embodiments of the central aperture can be between 5 and 50 inches in horizontal length, between 8 and 30 inches, between 10 and 20 inches, and 12 inches in horizontal length. In one embodiment, the body portion 400, the narrow upper portion 410, and/or the wider lower portion 420 may have a rounded shape or design. For example, the body portion 400, the narrow upper portion 410, and/or the wider lower portion 420 may form an overall cone with a round ring at the top, such as below the blades 150. In one embodiment, the body portion 400, the narrow upper portion 410, and/or the wider lower portion 420 may have a flat shape or design. In another example, the rounded or flat shape or design may form a structure where the body portion 400, the narrow upper portion 410, and/or the wider lower portion 420 have a multi-sided polygon structure with a polygonal ring at the top. In one example, the multi-sided polygon structure may include 7-10 sides.

Embodiments of the body portion 400 are between 10 and 100 inches in height, between 15 and 75 inches in height, and between 20 and 50 inches in height. Embodiments can include a body portion that is 21 inches in height. Embodiments of the body portion are between 10 and 500 inches in diameter, between 25 and 250 inches in diameter, and between 50 and 100 inches in diameter. Embodiments can include a body portion 400 that is 50 inches in diameter.

Figure 5:
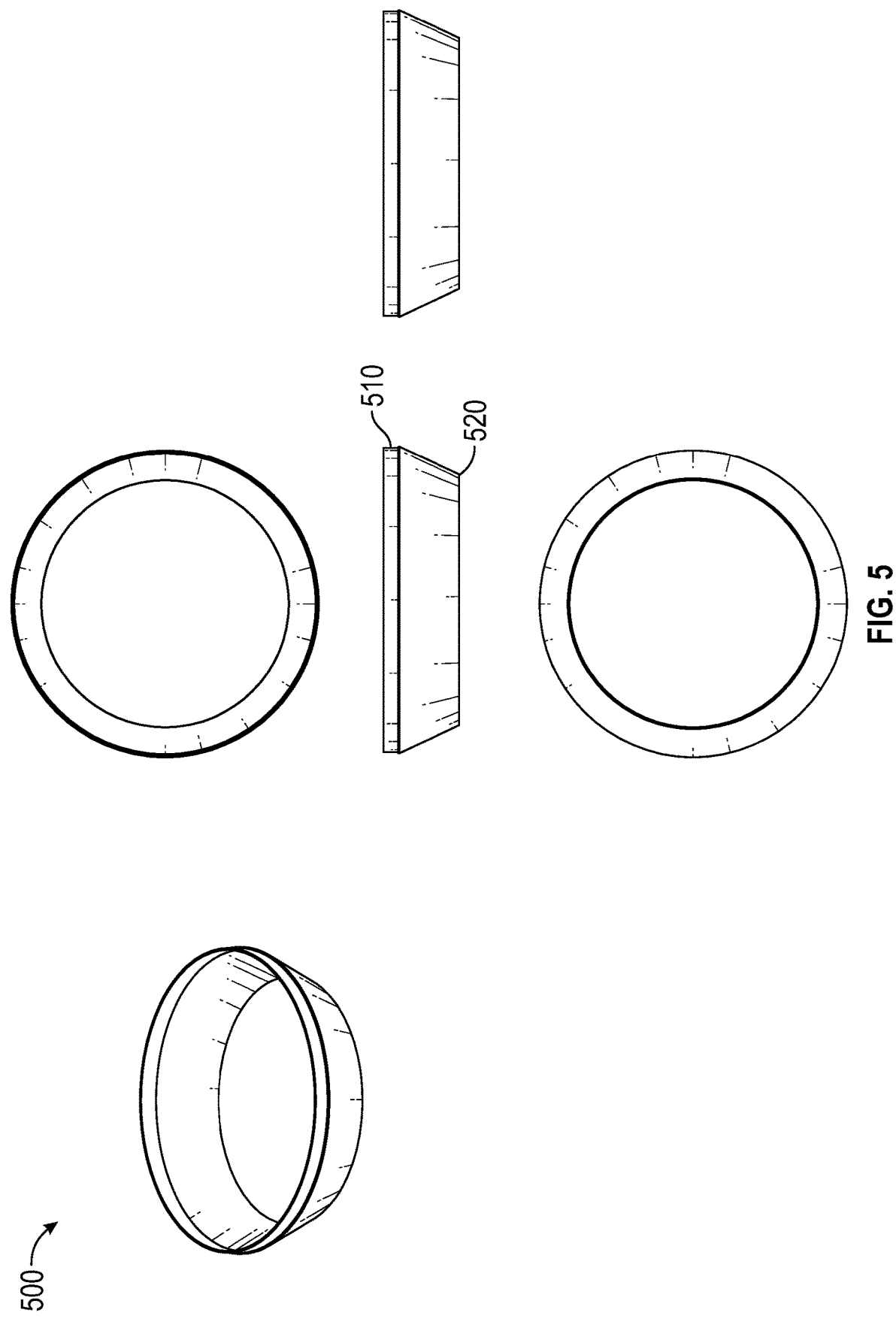
FIG. 5 illustrates a base of a vertical axis wind turbine, according to an embodiment.

FIG. 5 illustrates the base portion 500, according to an embodiment. The base portion 500 has a tapered circular geometry, in which the base portion 500 tapers inwards as the base extends downward. The tapering of the base portion 500 assists with wind egress from the wind turbine. The base portion may taper inward from the upper base portion 510 to the lower base portion 520. The angle of tapering may between 10° and 40°, between 15° and 30°, or between 20° and 25°. The base portion 500 can be coupled to the body portion 400 via welding, soldering, adhesive, bolts, screws, and combinations thereof.

Embodiments of the base portion 500 can have upper (larger) diameter between 10 and 500 inches in diameter, between 25 and 250 inches in diameter, and between 50 and 100 inches in diameter. Embodiments can include an upper base portion 510 that is 42 inches in diameter. The lower base portion 520 can have a diameter between 10 and 500 inches in diameter, between 25 and 250 inches in diameter, and between 50 and 100 inches in diameter. Embodiments can include an upper base portion 510 that is 34 inches in diameter. The thickness of the base portion 500 can be between 1 inch and 5 inches, between 2 inches and 3 inches, and 2.5 inches. The size and dimensions of the base portion may vary based on the desired final output rating for the vertical axis wind turbine. In one example, the base portion 500 may be 3 inches wide by 4 inches tall to have a reduces size with a reduced output rating. In another example, the base portion 500 may be 5 inches wide by 7 inches tall to have a larger size with an increase output rating.

Figure 6:
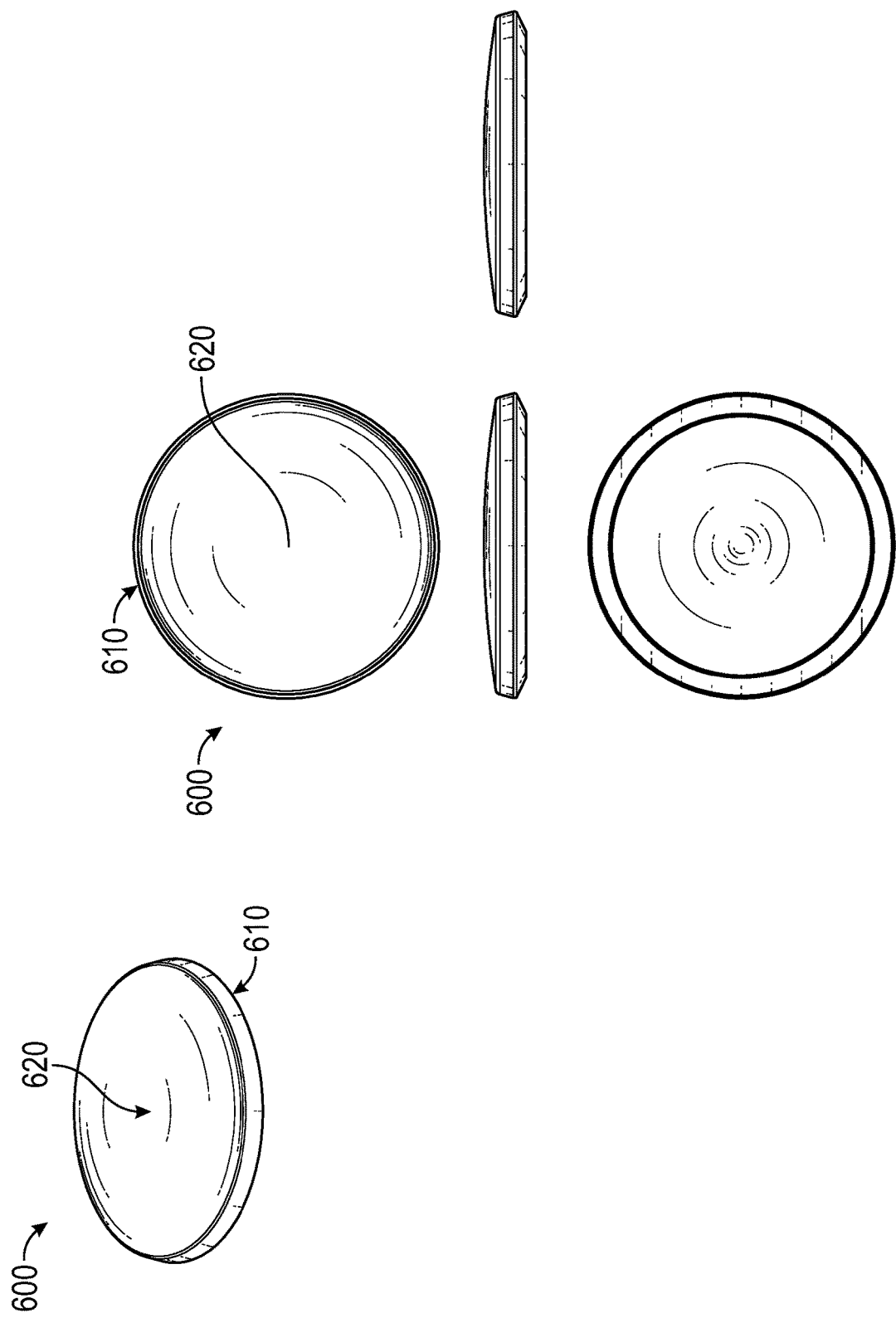
FIG. 6 illustrates a top portion of a vertical axis wind turbine, according to an embodiment.

FIG. 6 illustrates a view of the top portion 600, according to an embodiment. The top portion 600 illustrated in FIG. 6 has a solid dome 620 in contrast to the lattice structure illustrated in FIG. 2. The dome 620 redirects wind towards the blades and forces egress of the wind through the body portion aperture and out the bottom of the wind turbine. Embodiments of the dome 620 can be convex geometry with a peak at the central point of the dome 620 tapering downwards toward the top portion exterior edge 610. The exterior edge 610 can be between 1 and 5 inches in vertical height, between 2 and 3 inches in vertical height, and between 2.5 and 2.75 inches in vertical height. The exterior edge 610 can be angled to accommodate the aerodynamics of the wind turbine.

Figure 7:
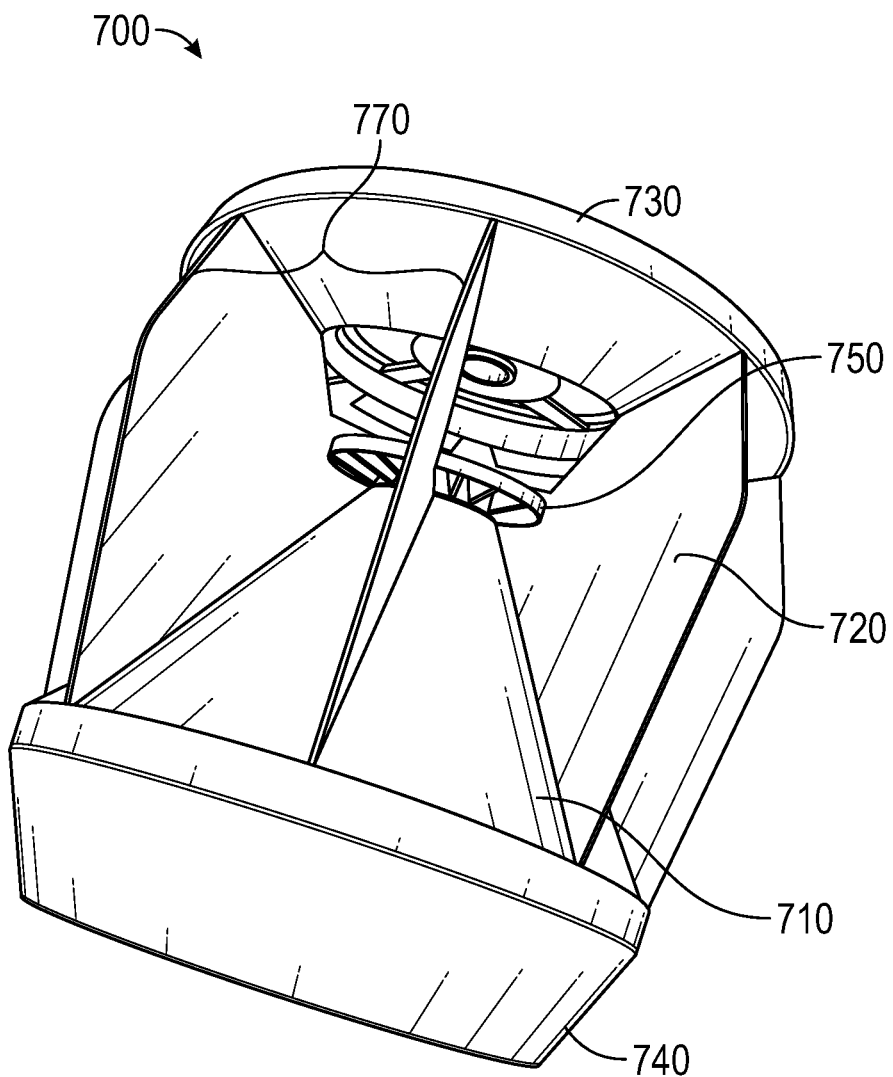
FIG. 7 illustrates an alternative vertical axis wind turbine, according to an embodiment.

FIG. 7 illustrates a vertical axis wind turbine 700, according to an embodiment. The vertical axis wind turbine 700 illustrated in FIG. 7 depicts a ring blade 750 located in the central axis of the vertical axis wind turbine 700. The vertical axis wind turbine 700 further includes a body portion 710, vanes 720, a top portion 730, a base portion 740, and channels 770. The vertical axis wind turbine 700 includes a solid or domed top portion similar to the top portion depicted in FIG. 6. The blade 750 is configured in a ring structure with multiple blades extending radially from the central axis point and linked by an exterior ring frame. The ring structure receives the wind energy directed into the channels and spins a central axis coupled to a generator.

Figure 8:
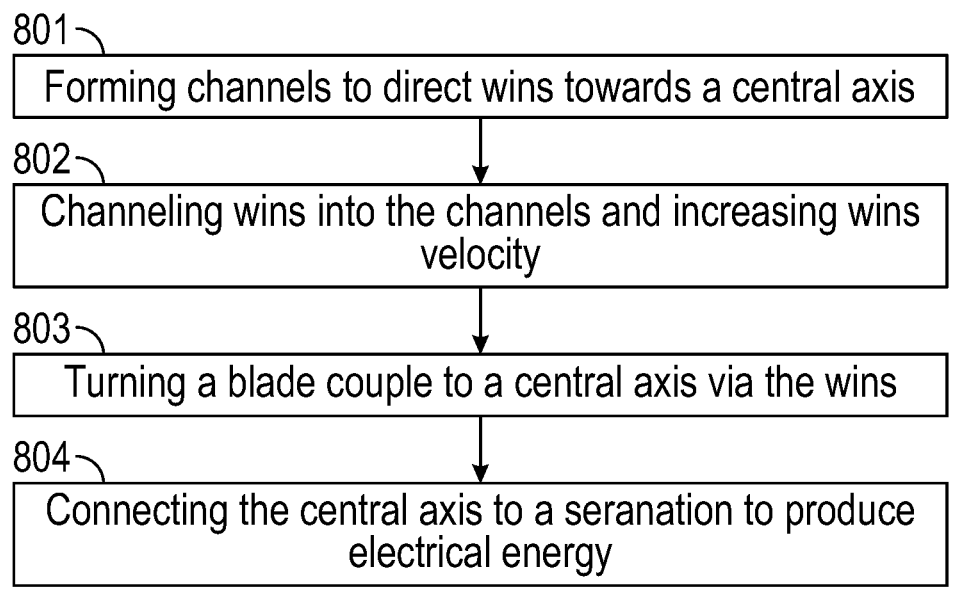
FIG. 8 illustrates a flow chart of a method of producing wind energy via the vertical axis wind turbine, according to an embodiment.

FIG. 8 illustrates a flow chart of a method of producing wind energy via the vertical axis wind turbine, according to an embodiment. Embodiments of the method for producing electrical energy from wind via a vertical axis wind turbine include step 801 forming channels to direct wind towards a central axis. The channels are formed via vanes extending radially from a body portion of the vertical axis wind turbine and vertically between a top portion and a base portion of the vertical axis wind turbine. Step 802 includes channeling the wind into the channels and increasing the wind velocity via decreasing the area of the channels as the channel approaches a central axis of the vertical axis wind turbine. Step 803 includes turning a blade coupled to the central axis of the vertical axis wind turbine via the wind. Step 804 includes connecting the central axis to a generator configured to produce electricity via the rotation of the central axis.

A feature illustrated in one of the figures may be the same as or similar to a feature illustrated in another of the figures. Similarly, a feature described in connection with one of the figures may be the same as or similar to a feature described in connection with another of the figures. The same or similar features may be noted by the same or similar reference characters unless expressly described otherwise. Additionally, the description of a particular figure may refer to a feature not shown in the particular figure. The feature may be illustrated in and/or further described in connection with another figure.

Elements of processes (i.e, methods) described herein may be executed in one or more ways such as by a human, by a processing device, by mechanisms operating automatically or under human control, and so forth. Additionally, although various elements of a process may be depicted in the figures in a particular order, the elements of the process may be performed in one or more different orders without departing from the substance and spirit of the disclosure herein.

The foregoing description sets forth numerous specific details such as examples of specific systems, components, methods and so forth, in order to provide a good understanding of several implementations. It will be apparent to one skilled in the art, however, that at least some implementations may be practiced without these specific details. In other instances, well-known components or methods are not described in detail or are presented in simple block diagram format in order to avoid unnecessarily obscuring the present implementations. Thus, the specific details set forth above are merely exemplary. Particular implementations may vary from these exemplary details and still be contemplated to be within the scope of the present implementations.

Related elements in the examples and/or embodiments described herein may be identical, similar, or dissimilar in different examples. For the sake of brevity and clarity, related elements may not be redundantly explained. Instead, the use of a same, similar, and/or related element names and/or reference characters may cue the reader that an element with a given name and/or associated reference character may be similar to another related element with the same, similar, and/or related element name and/or reference character in an example explained elsewhere herein. Elements specific to a given example may be described regarding that particular example. A person having ordinary skill in the art will understand that a given element need not be the same and/or similar to the specific portrayal of a related element in any given figure or example in order to share features of the related element.

It is to be understood that the foregoing description is intended to be illustrative and not restrictive. Many other implementations will be apparent to those of skill in the art upon reading and understanding the above description. The scope of the present implementations should, therefore, be determined with reference to the appended claims, along with the full scope of equivalents to which such claims are entitled.

The foregoing disclosure encompasses multiple distinct examples with independent utility. While these examples have been disclosed in a particular form, the specific examples disclosed and illustrated above are not to be considered in a limiting sense as numerous variations are possible. The subject matter disclosed herein includes novel and non-obvious combinations and sub-combinations of the various elements, features, functions and/or properties disclosed above both explicitly and inherently. Where the disclosure or subsequently filed claims recite "a" element, "a first" element, or any such equivalent term, the disclosure or claims is to be understood to incorporate one or more such elements, neither requiring nor excluding two or more of such elements.

As used herein "same" means sharing all features and "similar" means sharing a substantial number of features or sharing materially important features even if a substantial number of features are not shared. As used herein "may" should be interpreted in a permissive sense and should not be interpreted in an indefinite sense. Additionally, use of "is"

regarding examples, elements, and/or features should be interpreted to be definite only regarding a specific example and should not be interpreted as definite regarding every example. Furthermore, references to "the disclosure" and/or "this disclosure" refer to the entirety of the writings of this document and the entirety of the accompanying illustrations, which extends to all the writings of each subsection of this document, including the Title, Background, Brief description of the Drawings, Detailed Description, Claims, Abstract, and any other document and/or resource incorporated herein by reference.

As used herein regarding a list, "and" forms a group inclusive of all the listed elements. For example, an example described as including A, B, C, and D is an example that includes A, includes B, includes C, and also includes D. As used herein regarding a list, "or" forms a list of elements, any of which may be included. For example, an example described as including A, B, C, or D is an example that includes any of the elements A, B, C, and D. Unless otherwise stated, an example including a list of alternatively-inclusive elements does not preclude other examples that include various combinations of some or all of the alternatively-inclusive elements. An example described using a list of alternatively-inclusive elements includes at least one element of the listed elements. However, an example described using a list of alternatively-inclusive elements does not preclude another example that includes all of the listed elements. And, an example described using a list of alternatively-inclusive elements does not preclude another example that includes a combination of some of the listed elements. As used herein regarding a list, "and/or" forms a list of elements inclusive alone or in any combination. For example, an example described as including A, B, C, and/or D is an example that may include: A alone; A and B; A, B and C; A, B, C, and D; and so forth. The bounds of an "and/or" list are defined by the complete set of combinations and permutations for the list.

Where multiples of a particular element are shown in a FIG., and where it is clear that the element is duplicated throughout the FIG., only one label may be provided for the element, despite multiple instances of the element being present in the FIG. Accordingly, other instances in the FIG. of the element having identical or similar structure and/or function may not have been redundantly labeled. A person having ordinary skill in the art will recognize based on the disclosure herein redundant and/or duplicated elements of the same FIG. Despite this, redundant labeling may be included where helpful in clarifying the structure of the depicted examples.

The Applicant(s) reserves the right to submit claims directed to combinations and sub-combinations of the disclosed examples that are believed to be novel and non-obvious. Examples embodied in other combinations and sub-combinations of features, functions, elements and/or properties may be claimed through amendment of those claims or presentation of new claims in the present application or in a related application. Such amended or new claims, whether they are directed to the same example or a different example and whether they are different, broader, narrower or equal in scope to the original claims, are to be considered within the subject matter of the examples described herein.

The invention claimed is:

1. A device, comprising:
 a vertical axis wind turbine configured to receive an incoming wind from 360°, the vertical axis wind turbine comprising:
  a central axis extending vertically along the wind turbine;
  a top portion having a circular geometry; and one or more openings that coincide with the location of one or more vanes the one or more openings configured to allow for airflow
  a body portion with a conical geometry comprising:
   an upper body portion;
   a lower body portion; and
   a body portion aperture formed in a center of the upper body portion;
    wherein the body portion:
     is configured to have a center point positioned on the central axis, wherein the body portion tapers inwardly along a direction extending from the lower body portion to the upper body portion; and
     forms, with the one or more vanes, one or more channels around the perimeter of the wind turbine;
  a base portion coupled below the body portion comprising:
   a base portion aperture surrounded by a tapered circular geometry; and
   a center point positioned on the central axis;
  a drive shaft:
   extending along the central axis; and
   configured to be rotatably driven by a blade configured to receive the incoming wind;
  a generator:
   operationally coupled to the drive shaft; and
   configured to produce electrical energy from a rotation of the drive shaft;
  wherein the one or more vanes:
   extend radially outward from the body portion; and
   extend vertically from the top portion to the base portion;
  wherein the one or more vanes and the body portion collectively form one or more channels around the perimeter of the wind turbine, the one or more channels being configured to increase velocity of the incoming wind via tapering of a cross-sectional area of each channel as each channel approaches the central axis; and
  wherein the base portion aperture facilitates wind egress from the vertical axis wind turbine in response to a portion of the wind passing downwardly through the body portion aperture.

2. The device of claim 1, wherein the vanes further comprise:
 a vane exterior edge;
 a vane interior edge coupled to the body portion; and
 a vane cut-out portion configured to allow the blade to rotate about the central axis.

3. The device of claim 2, wherein:
 the vane cut-out portion forms a 90° vane cut-out portion interior angle, and
 the vane exterior edge is angled at a point opposite the 90° vane cut-out portion interior angle.

4. The device of claim 1, wherein the top portion further comprises:
 rings, and
 spokes configured to link the rings,
  wherein the rings and spokes are configured to align with the one or more openings and allow wind egress from the vertical axis wind turbine.

5. The device of claim 1, wherein the top portion comprises a convex dome configured to direct the portion of the wind towards the body portion aperture formed in the center of the upper body portion.

6. The device of claim 1, wherein:
the body portion has a taper of 45°; and
the base portion has a taper of 10°.

7. The device of claim 6, comprising:
eight vanes;
eight channels; and
a ring structure coupled to the blade, wherein the blade comprises one or more blades.

8. The device of claim 1, wherein the top portion further comprises spokes which are aligned with the location of the vanes, and the alignment is configured to assist wind egress from the vertical axis wind turbine.

9. A method, comprising:
producing electrical energy from wind via a vertical axis wind turbine configured to receive an incoming wind from 360° wherein the vertical axis wind turbine includes a central axis extending vertically along the wind turbine;
the method further comprising:
providing a top portion having a circular geometry and comprising one or more openings that coincide with the locations of one or more vanes, the one or more openings configured to allow for airflow;
providing a body portion with a conical geometry comprising an upper body portion, a lower body portion, and a body portion aperture formed in a center of the upper body portion and configured to have a center point positioned on the central axis;
providing a base portion having a tapered circular geometry comprising a base portion aperture configured to have a center point positioned on the central axis wherein the one or more vanes extend radially outward from the body portion and vertically from the top portion to the base portion;
forming one or more channels around the perimeter of the wind turbine central axis, wherein the channels are formed via the vanes and the body portion forming channels to direct wind towards a central axis;
channeling the wind into the channels and increasing wind velocity via decreasing cross-sectional area of the channels as each channel approaches the central axis of the vertical axis wind turbine;
redirecting a portion of the wind downward through the body portion aperture in the upper body portion and allowing for wind egress through the base portion aperture;
providing a drive shaft extending along the central axis and a blade configured to receive the incoming wind;
turning the blade coupled to the drive shaft via the wind, wherein the blade causes rotational movement of the drive shaft; and
connecting a generator to the drive shaft to produce electrical energy from the rotation of the drive shaft.

10. The method of claim 9, wherein the blade comprises:
a ring structure comprising multiple blades extending radially from the central axis point and linked by an exterior ring frame; and
the ring structure is configured to rotate around the central axis and within a vane cut-out portion on a vane interior edge.

11. The method of claim 9, wherein the top portion comprises:
spokes and rings;
wherein the spokes and rings are configured:
to align with the vanes, and
allow egress of wind from the vertical axis wind turbine.

12. The method of claim 9, wherein the vanes extend outward from the body portion in a curvilinear geometry.

13. The method of claim 9, wherein:
the vanes have a variable thickness as the vane extends inwards toward the body portion, and
the variable thickness is configured to increase tapering of the channels adjacent to the vanes.

14. The method of claim 13, wherein the top portion is a convex dome and the thickness of the top portion is variable.

15. The method of claim 10, wherein:
the body portion has a taper of 30°;
the base portion has a taper of 15°, and
the vane cut-out portion has an interior angle of 110°.

16. A system, comprising:
a vertical axis wind turbine configured to receive an incoming wind from 360°;
wherein the vertical axis wind turbine comprises:
a central axis extending vertically along the wind turbine;
a top portion having a circular geometry and one or more openings that coincide with the locations of one or more vanes and which are configured to allow for airflow;
a body portion with a conical geometry comprising:
an upper body portion;
a lower body portion; and
a body portion aperture formed in a center of the upper body portion and configured to have a center point positioned on the central axis;
wherein the body portion tapers inwardly along a direction extending from the lower body portion to the upper body portion;
a base portion having a tapered circular geometry comprising a base portion aperture configured to have a center point positioned on the central axis, the base portion being coupled below the body portion;
wherein the one or more vanes extend radially outward from the body portion and vertically from the top portion to the base portion;
wherein the one or more vanes and the body portion collectively form one or more channels around the perimeter of the wind turbine, the one or more channels being configured to increase velocity of the incoming wind via tapering of a cross-sectional area of each channel as each channel approaches the central axis;
wherein the base portion aperture facilitates wind egress from the vertical axis wind turbine after a portion of the wind passes downward through the body portion aperture;
a drive shaft extending along the central axis and configured to be rotatably driven by a blade configured to receive the incoming wind, wherein the blade causes rotational movement of the drive shaft; and a generator operationally coupled to the drive shaft and configured to produce electrical energy from-the rotational movement of the drive shaft.

17. The system of claim 16, wherein the top portion:
has a lattice structure configured to allow egress of wind, and
the body portion has a taper of 50°.

18. The system of claim 16, wherein the base portion:
has a taper of 15°, and
the base portion comprises a base portion aperture with a diameter of 50 inches.

19. The system of claim 17, wherein the vanes:
have a vane cut-out portion with a 100° interior angle, and
the vanes align with the lattice structure of the top portion.

20. The system of claim 16, further comprising:
between 6 and 10 vanes;
between 6 and 10 channels;
wherein the top portion is a convex dome; and
the body portion aperture has a diameter between 10 and 20 inches.

* * * * *